United States Patent
De Groot (10) Patent No.: US 10,788,271 B2
(45) Date of Patent: Sep. 29, 2020

(54) UNDERGROUND THERMAL ENERGY STORAGE

(71) Applicant: ECOVAT IP B.V., Uden (NL)

(72) Inventor: Adrianus Wilhelmus De Groot, Uden (NL)

(73) Assignee: ECOVAT IP B.V., Uden (NL)

( * ) Notice: Subject to any disclaimer, the term of this patent is extended or adjusted under 35 U.S.C. 154(b) by 103 days.

(21) Appl. No.: 15/829,854

(22) Filed: Dec. 1, 2017

(65) Prior Publication Data

US 2018/0087845 A1    Mar. 29, 2018

Related U.S. Application Data

(63) Continuation-in-part of application No. 14/901,679, filed as application No. PCT/NL2014/050422 on Jun. (Continued)

(30) Foreign Application Priority Data

Jun. 28, 2013   (NL) ..................... 2011061
Jun. 4, 2015    (NL) ..................... 2014916

(51) Int. Cl.
*F28D 20/00*    (2006.01)
*B65D 88/76*    (2006.01)
(Continued)

(52) U.S. Cl.
CPC ......... *F28D 20/0043* (2013.01); *B65D 88/76* (2013.01); *E02D 27/38* (2013.01);
(Continued)

(58) Field of Classification Search
CPC ...... F24H 7/00; F24H 7/04; F28D 2020/0008; F28D 2020/0013; F28D 2020/0078;
(Continued)

(56) References Cited

U.S. PATENT DOCUMENTS

| 947,205 A | 1/1910 | Tanchoff |
| 2,707,984 A * | 5/1955 | Goff .................. F16L 59/15 |
| | | 264/35 |

(Continued)

FOREIGN PATENT DOCUMENTS

| DE | 2136137 A1 | 2/1973 |
| DE | 2846348 A1 | 5/1980 |

(Continued)

OTHER PUBLICATIONS

DE 10 2005 052 162 A1 machine translation (Year: 2006).*
(Continued)

*Primary Examiner* — Gordon A Jones
(74) *Attorney, Agent, or Firm* — AEON Law, PLLC; Adam L. K. Philipp; David V. H. Cohen (57) ABSTRACT

Underground thermal energy storage in a cylindrical or n-gonal prism shape with a vertical axis, comprising an inner volume for holding a liquid, an outer wall, an inner wall around the inner volume, and a filling layer between the inner wall and the outer wall. The inner wall comprises a series of modular wall parts provided with a heat exchanger for exchanging thermal energy with the liquid. The modular wall parts, arranged in rings, contact the inner volume and have an elastic sealing limiting liquid flow between the inner volume and the filling layer and taking up thermal expansion of the modular wall parts. The filling layer comprises an insulating layer designed to keep the outer wall below 30° C. when the inner volume is at least 90° C., and a structural layer for maintaining the insulating layer and the inner wall's modular wall parts in position.

13 Claims, 8 Drawing Sheets

Related U.S. Application Data 26, 2014, now Pat. No. 10,024,549, which is a continuation-in-part of application No. PCT/NL2016/050373, filed on May 25, 2016.

(60) Provisional application No. 62/170,843, filed on Jun. 4, 2015.

(51) Int. Cl.
    *F28D 1/06*     (2006.01)
    *E04H 7/18*     (2006.01)
    *E02D 27/38*     (2006.01)
    *F25D 1/00*     (2006.01)

(52) U.S. Cl.
    CPC .............. *E04H 7/18* (2013.01); *F28D 1/06* (2013.01); *F25D 1/00* (2013.01); *F28D 20/0039* (2013.01); *F28D 2020/0013* (2013.01); *F28D 2020/0078* (2013.01); *Y02E 60/142* (2013.01)

(58) Field of Classification Search
    CPC ... F28D 1/06; F24D 3/12; F24D 3/127; F24D 11/003
    See application file for complete search history.

(56) References Cited

U.S. PATENT DOCUMENTS

| | | | |
|---|---|---|---|
| 3,712,012 A | | 1/1973 | Meyer et al. |
| 4,235,221 A | * | 11/1980 | Murphy .................. F03G 6/00 126/567 |
| 7,891,187 B2 | * | 2/2011 | Mohr .................. F28D 20/0056 60/641.2 |
| 2009/0249726 A1 | | 10/2009 | Fernandez |
| 2011/0303214 A1 | * | 12/2011 | Welle ...................... F24S 10/80 126/578 |
| 2013/0292100 A1 | | 11/2013 | Karlsson |
| 2014/0069605 A1 | | 3/2014 | Sullivan et al. |

FOREIGN PATENT DOCUMENTS

| | | | | |
|---|---|---|---|---|
| DE | 2931861 A1 | | 2/1981 | |
| DE | 29518313 U1 | | 2/1996 | |
| DE | 102005052162 A1 | * | 5/2006 | ............... E02D 5/10 |
| DE | 202006005592 U1 | | 8/2007 | |
| EP | 2578981 A1 | * | 4/2013 | |
| FR | 2237156 A | * | 7/1973 | ............... B22C 9/06 |
| GB | 1527223 A | * | 10/1978 | ............... F28D 1/06 |
| JP | 228230 A | | 10/1986 | |
| WO | 9428319 A1 | | 12/1994 | |
| WO | 2014209121 A1 | | 12/2014 | |

OTHER PUBLICATIONS

Foamglas® Insulation Systems; Protecting Companies and Their People Worldwide (Year: 2009).*
O.O. Fasina & Z. Colley; Viscosity and Specific Heat of Vegetable Oils as a Function of Temperature: 35° C. to 180° C. (Year: 2009).*
O'Meara, Meghan; Determination of the Interfacial Tension between Oil/Steam and Oil/Air at Elevated Temperatures. (Under the direction of Dr. Brian Farkas.) (Year: 2012).*
EP-2578981-A1 MT (Year: 2013).*
FR 2237156 A mt (Year: 1973).*

* cited by examiner

UNDERGROUND THERMAL ENERGY STORAGE

CROSS REFERENCE TO RELATED APPLICATIONS

This application is a continuation-in-part of U.S. patent application Ser. No. 14/901,679 filed Dec. 28, 2015, entitled "Wall part, heat buffer and energy exchange system," which is a U.S. national phase entry of PCT Application No. PCT/NL2014/050422 filed Jun. 26, 2014, which claims priority to Dutch Patent Application No. NL2011061 filed Jun. 28, 2013, each of which is incorporated herein by reference in its entirety for all purposes.

This application is also a continuation-in-part of PCT Application No. PCT/NL2016/050373 filed May 25, 2016, entitled "Underground thermal energy storage," which claims priority to Dutch Patent Application No. NL2014916 filed Jun. 4, 2015 and claims the benefit of U.S. Provisional Patent Application No. 62/170,843 filed Jun. 4, 2015, each of which is incorporated herein by reference in its entirety for all purposes.

FIELD OF THE INVENTION

The invention relates to an underground thermal energy storage and method for constructing an underground thermal energy storage.

BACKGROUND OF THE INVENTION

The increasing use of renewable energy sources has made the need for large-scale energy storage more urgent. Storage of thermal energy provides a safe and relatively economic way of storing energy. In particular as a large part of the energy need relates to thermal energy, for instance for temperature control in buildings.

The current applicant in his earlier application WO2014209121 according to its abstract provides a heat buffer comprising at least mechanically coupled wall parts, wherein each of the wall parts comprises a substantially plate-like body; a liquid throughflow circuit incorporated in the body; one or more hydraulic couplings accessible from the outer side of the wall part for discharge and supply of liquid to the liquid throughflow circuit and configured for coupling to hydraulic couplings of a similar device; and is coupled at a mutual angle about a substantially vertical axis to a similar wall part, wherein the mechanically coupled devices are connected such that they enclose one space and wherein the heat buffer also comprises a floor and/or cover part for closing the enclosed space on an upper and/or underside.

DE202006005592U1 according to its abstract describes a water storage tank in the form of a buried tank to be buried protected from frost in the ground, characterized in that the water storage tank is in thermal contact with the surrounding ground and is constructed as a heat exchanger.

DE2931861 according to its abstract describes an underground water reservoir that is for direct connection to a heat pump or may be used with a solar heating system. It carries an insulating layer of a rigid foam material. This is in turn protected by a load bearing layer of e.g. concrete in which are embedded the coils of a heat exchanger. The tank forming the reservoir is filled with water or other liquid and protected against frost by having in the water bodies filled with a liquid which can be solidified, more easily than water. The tank can be mounted horizontally or vertically.

U.S. Pat. No. 3,712,012 according to its abstract describes a reinforced-conrete vessel adapted to withstand pressure, e.g. for a pressurized-fluid nuclear reactor, has an inner lining of corrosion-resistant (stainless) steel having vertically or horizontally-running corrugations, the crests of which are supported by steel profiles.

SUMMARY OF THE INVENTION

The current invention provides an energy storage that is relatively simple and cheap to produce. Further or alternatively, the invention provides an energy storage that is relatively easy and economic to build. Further or alternatively, the invention provides an energy storage that is relatively easy and economic to operate.

Hence, it is an aspect of the invention to provide an underground thermal energy storage having a shape selected from substantially cylindrical and an n-gonal prism, having an axial direction that in use is vertical, and comprising an inner volume for holding a liquid, said energy storage device comprising a peripheral outer wall, a peripheral inner wall around said inner volume, and a filling layer between said inner wall and said outer wall, said inner wall comprising a series of modular wall parts provided with a heat exchanger for exchanging thermal energy with said liquid, said modular wall parts arranged in rings and said modular wall parts each having opposite radial surfaces that are in use vertical, an inner tangential surface contacting said inner volume, an outer tangential surface directed towards said outer wall, and opposite axial surfaces that are in use horizontal, said modular wall parts comprising an elastic sealing between a joint of adjacent radial surfaces for limiting liquid flow between the inner volume and the filling layer and taking up thermal expansion of the modular wall parts, and said filling layer comprising an insulating layer extending over at least part of a height of the underground energy storage, having a thermal resistance R value where $R=d/\lambda$ [m2K/W], in which d is a layer thickness of the insulating layer, and $\lambda$ the thermal conductivity of said insulating layer, and R is designed for providing said outer wall at a temperature of below 30° C. when said inner volume is at a temperature of at least 90° C., and a structural layer for maintaining said insulating layer and said prefab inner wall parts in position The heat buffer of the applicant in an embodiment can be build in the following way.

Making an outer wall in situ, substantially circle cylindrically enclosing an inner space;

removing the soil from the inner space, allowing it to become filled with ground water;

placing wall parts inside the inner space and which enclose an inner volume.

In this respect, the R defines the thermal resistance of an insulating material layer and is defined as $R=d/\lambda$ [m²K/W], in which d is a layer thickness of an insulating layer, and $\lambda$ the thermal conductivity, a material property of an insulating layer. When different layers are combined, the R-value of the layers are added together. R is for instance mentioned in ASTM D5470 which defines a method of determining R. In this sense, R is relevant for the heat-transport via conduction in a solid material, according to Fourier's law, which couples R to temperature (difference). In the current invention, the insulating layer can be composed of different combined layers. The insulating layer or its R value may vary also with the height of the heat buffer.

The outer wall in an embodiment forms what is referred to as a is a temporary formwork for concrete (known in Dutch as "verloren bekisting"). In such an embodiment, a gap between the wall parts and the outer wall is at least partially filled with material forming a structural layer.

A series of wall parts may form a closed ring, and several closed rings can then be placed on top of one another to enclose the inner volume. The inner volume exchanges heat with the wall parts. Thus, stratified layers can be created that each have their own temperature, from bottom to top having an increasing temperature. A boundary between such stratified temperature layers are referred to as thermoclines. In such a thin layer, the temperature changes rapidly. An alternative way of obtaining stratified layers of the medium may be using density-stratified layers. This can be accomplished by selection of liquids, or by additions to water. Separation layers may be inserted between layers of the medium. In this way, layers may also have their own, different temperature.

The underground thermal energy storage has a vertical outer wall and a vertical inner wall. It uses a medium inside the underground tank to store thermal energy. The underground thermal energy storage thus in fact may form an underground tank, holding one or more liquids for storing thermal energy.

The underground thermal energy storage in an embodiment is adapted for arranging the liquid(s) or medium to form stratified layers, each stratified layer having its own temperature. Usually, the lowest layer has the lowest temperature, and each subsequent layer has a higher temperature. Thermal energy is stored by exchanging heat with the medium.

In an embodiment, the inner wall comprising a series of heat exchangers for exchanging thermal energy with said liquid, said heat exchangers arranged in rings.

In order to maintain or create the stratified temperature layers, in an embodiment the heat exchangers are provided in such a way that they may be operated as rings of heat exchangers.

In an embodiment, the modular wall parts are each provided with a heat exchanger for exchanging thermal energy with said liquid, and wherein said modular wall parts are arranged in rings.

Making such an underground tank, ensuring its integrity during decades, providing a thermal storage that allows efficient storages with minimal energy losses and which can be build efficiently, poses many demands on the structure that may contradict one another. It was found that for instance influences were the temperature changes in the medium, that induce expansion and contraction. Another influence is the temperature of 90° C. or even higher of the medium. It was found that this may influence the structure and its integrity.

The energy storage in an embodiment encloses an inner of at least 50 m$^3$. In an embodiment, the inner volume is at least 100 m$^3$. An enclosed volume may be up to 100.000 m$^3$. In most embodiments, the enclosed volume will be between 1000 and 60.000 m$^3$.

The medium in an embodiment comprises water. This allows temperature of above the freezing point and below the boiling point. between about 0° C. and about 90° C. or even 95° C. In general, a medium is selected operate in a liquid state. Alternatively, the medium may comprise solid particles surrounded by a liquid medium.

For using the medium of a layer of the medium for "cold" storage, i.e., for cooling for instance, a brine may be used. This allows temperatures of below −5° C. In particular if a brine is used that has a salt contents of more than 200 gr/l, the temperature may be lowered to −15° C.

In an embodiment, the medium is water comprising a dissolved salt. In an embodiment, the salt is an inorganic salt. In an embodiment, the salt comprises NaCl, more in particular it comprises at least 80% by wt. NaCl.

Alternatively, a medium may be selected that allows temperature of more than 90° C., i.e., a medium that remains liquid of remains to comprise a liquid portion at higher temperatures. To that end, for instance oils may be used. An example is for instance mono polypropylene glycol. In cases, also other thermal oils may be used. In general, thermal oil is known to a skilled person. these cases, fluid closure of the energy storage may become more important. In an embodiment, the medium comprises a mixture of particulate material and a liquid material. In an embodiment, the specific density of the particulate material is larger than the density of the liquid material. The particulate material may comprise a stone. For instance, the particulate material comprises rocks or pebbles or flint. In an embodiment, the average diameter of the particulate material is between 1 and 5 cm. This allows the liquid fraction to flow between the particles an thus transport heat energy. In an embodiment, the standard deviation of the spreading of the particle diameter is between 0.2 and 5 cm. In an embodiment, the liquid comprises is a thermal oil. Alternatively, the liquid comprises a glycol, in particular mono propylene glycol.

The underground energy storage has a shape selected from substantially cylindrical and an n-gonal prism. In an embodiment, it gas a substantially cylindrical shape. It may have a substantially elliptical or cylindrical cross section. In an embodiment, the shape is substantially an n-gonal prism. The outer wall in an embodiment has an n between 10 and 50. In practise, the outer wall will thus be almost circular. The inner wall in an embodiment has an n of between 8 and 20. In view of the usual size of the storage, this will also be almost circular. In an embodiment, the outer wall will have a vertical height of between 10 and 20 meter. The diameter in an embodiment is between 10 and 50 meter.

The underground energy storage in an embodiment has a planar lower and upper end, making its shape in fact a right cylinder or a right n-gonal prism. In use, the underground energy storage has a longitudinal axis that is vertical. From the axis are further defined a radial direction and a tangential direction. The surfaces of walls of the storage are defined such that a radial surface extends in radial direction, a tangential surface extends in tangential direction, and an axial surface has its normal parallal to the axial direction.

The underground energy storage is provided for holding a liquid in stratified thermal zones.

In an embodiment, the insulating material is resistant to compressing forces. In a further embodiment, the insulating material does not absorb water. To that end, the insulating material may for instance be enclosed by a sealing material.

In an embodiment, the insulating material has a pressure resistance of at least 4 kg/cm$^2$ (about 390 kPa) More in particular, the pressure resistance is at least 6 kg/cm$^2$ (about 588 kPa) In an embodiment, the heat conductivity coefficient $\lambda_p$ is between 0.02-0.05 W/(m·K). It was found that a suitable material is a for instance cellular glass. This material for instance marketed under the name foamglas.

Alternatively, the insulating material may comprise a flexible container provided with perlite.

In an embodiment, an insulating layer is attached to the (in use) outer surface of the wall parts. In an embodiment, an adhesive material is used, in particular a flexible adhesive material. On the other hand, the adhesive material hold the usually relatively light insulating material at their position on the wall parts, at least until the structural layer is formed.

In an embodiment, the adhesive material comprises a bitumen or asphalt material. This may be a composite material comprising bitumen. In an embodiment, the adhesive is a one-component material. This material as such is known to a skilled person.

In an embodiment, the R value at an upper part of said energy storage is at least 8 m²K/W, more in particular at least 10 m²K/W. It was found that such an insulation layer would prevent heating of the outer wall. This heating might have a negative influence on the outer wall.

In an embodiment, the sealing comprises an elastically compressible sealing, compressible in tangential direction, between adjacent radial surfaces for limiting liquid flow between the inner volume and the filling layer, said sealing providing a vertical expansion joint. It was found that such e sealing would be sufficient to overcome the effect of temperature changes of a medium inside the storage. In fact, with wall parts of about 1-2 meters wide, a flexible sealing that allows a movement of between 1-3 cm would already be sufficient.

In an embodiment, the insulating layer has a pressure resistance (for instance according to EN 826-4) of more than 500 kPa, in particular said insulating layer comprises material selected from glass foam and perlite. For instance, perlite and the like may be included in a flexible container.

In an embodiment, the structural layer is selected from concrete, bentonite, a bentonite composition, or a combination thereof. It was found that a setting composition in this way was able to release some pressure from the outer wall. Additionally, it was able to press the wall parts together. Thus, the structural layer in fact performs the function of the hoops in a classical barrel, while the wall parts perform the function of the staves of a classical barrel.

In an embodiment, the peripheral outer wall is an in-situ produced wall, in particular using an in-situ produced soil mix wall, in particular made by a soil mix process. This was found to provide in fact a stable, outer wall. After the structural layer is provided, it in fact functioned as a temporary form.

In an embodiment, the modular wall parts are arranged in functionally thermally insulated rings. In an embodiment, wall parts are positioned on top of one another, forming in fact functionally staves of a barrel, while in the mean time also being arranged in rings.

In an embodiment, the energy storage further comprises an axial thermally insulating layer between adjacent axial surfaces of the rings, in particular, wherein said wall parts are separated by horizontal heat barriers. Thus, the rings may form thermally separated heat exchange rings for allowing heat storage at various layers of medium. In an embodiment, the energy storage further comprising a bottom. Such a bottom may be provided using for instance hydraulic cement that is provided at the bottom of that the inner space once at least part of the inner wall is provided.

In an embodiment, as mentioned, in use the inner volume is at least partially filled with a medium, in particular a that is liquid for allowing energy storage.

In an embodiment, the medium comprises layers having different densities, the thickness of these layers corresponding to said rings, in particular at least one of said layers comprise an oil, preferably a vegetable oil, in an upper layer of said medium.

In an embodiment, the energy storage further comprises a medium comprising a lowest layer allowing a temperature below a temperature outside said energy storage, in particular remaining liquid at a temperature below −5° C., more in particular a temperature below −15° C.

In an embodiment, the heat exchanger comprises one or more conduit systems at or below an inner surface of the wall parts. The conduit system thus extends in a transverse plane. In particular when each wall part is provided with a heat exchanger, and that exchangers of one ring are thermally coupled, in allows creation of (horizontal) layers of medium that are at a predetermined temperature.

In an embodiment, the invention further relates to a method for constructing an underground thermal energy storage, in particular providing a thermal energy storage as described above. In an embodiment, the method comprises:
 forming an in-situ outer wall in a trench around an inner volume;
 excavating said inner volume to provide an inner space surrounded by the outer wall;
 forming an inner wall within the inner space using modular wall parts, leaving a gap between the outer wall and the inner wall, and
 filling said gap with a filling layer.

The method was found to allow construction of a durable, lasting thermal energy storage in an economic manner.

In an embodiment, the outer wall is formed in-situ by means of a soil mix cutter. This method provides a stable wall at high speed and in an economic way. The thus created outer wall can in fact serve as a temporary construction.

In an embodiment, the inner wall is formed from prefabricated, modular wall parts.

In an embodiment, the prefabricated inner wall parts comprise insulating material attached to a surface of the prefabricated inner wall elements designed to be facing the outer wall.

In an embodiment, first a lowest ring of wall parts is positioned, aligned and fixed in said inner space.

In an embodiment, first alternating wall parts for said lowest ring of wall parts are positioned, aligned and fixed, then the remaining wall parts that complete the lowest inner ring are positioned, aligned and fixed.

In an embodiment, said wall parts of said lowest ring are positioned above a bottom of the inner space, while said wall parts are kept at their height position using a temporary provision, and after completion of said positioning, aligning and fixing of said lowest ring, a support structure is provided for each of the lowest wall parts, keeping said wall parts at their predetermined height position. In an embodiment thereof, said lowest wall parts are provided with a flexible container which is filled with a setting composition which extends between said lowest wall parts and said bottom for keeping said lowest wall parts further fixed at their position.

In an embodiment, the method further comprises providing said inner wall using said modular, prefabricated wall parts and providing each time a ring from said prefabricated, modular wall parts on top of a previous ring. In a further embodiment, the method further comprising an alignment actuator, wherein for positioning said modular wall parts of a ring, each time said alignment actuator provides a radial force directed inwards. In an embodiment, the alignment actuator comprises a series of balloons set at a fluid pressure and provided between said inner wall and said outer wall at a height of said ring.

The invention further provides an underground thermal energy storage having a shape selected from substantially cylindrical and an n-gonal prism, having an axial direction that in use is vertical, and comprising an inner volume for holding a liquid, said energy storage device comprising a peripheral outer wall, a peripheral inner wall around said inner volume, and a filling layer between said inner wall and said outer wall, said inner wall comprising a series of modular wall parts each having opposite radial surfaces that are in use vertical, an inner tangential surface contacting said inner volume, an outer tangential surface directed towards said outer wall, and opposite axial surfaces that are in use horizontal, said modular wall parts comprising an elastic sealing between a joint of adjacent radial surfaces for limiting liquid flow between the inner volume and the filling layer and taking up thermal expansion of the modular wall parts, and said filling layer comprising an insulating layer extending over at least part of a height of the underground energy storage, having an R value designed for providing said outer wall at a temperature of below 30° C. when said inner volume is at a temperature of at least 90° C., and a structural layer for maintaining said insulating layer and said prefab inner wall parts in position.

The energy storage provides an easy and stable construction that allows containment of a medium for storing energy.

In an embodiment, the energy storage comprises a heat exchanger for exchanging thermal energy with said liquid.

In an embodiment, the inner wall comprising a series of heat exchangers for exchanging thermal energy with said liquid, said heat exchangers arranged in rings.

In an embodiment, the modular wall parts are each provided with a heat exchanger for exchanging thermal energy with said liquid, and wherein said modular wall parts are arranged in rings.

The invention further provides an underground tank for thermal energy storage having an inner volume surrounded by a vertical inner wall designed to expand and contract in response to temperature changes; a rigid vertical outer wall; a gap defined by the vertical inner wall and the vertical outer wall; said gap comprising an insulating material so that the gap has an R value of at least 10 $m^2K/W$.

The term "substantially" herein, like in "substantially consists", will be understood by and clear to a person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally" will be understood by, and be clear to, a person skilled in the art. The term "substantially" as well as "functionally" may also include embodiments with "entirely", "completely", "all", etc. Hence, in embodiments the adjective functionally may also be removed. The term "functionally" is intended to cover deviations and variations in a feature to which it refers which are such that in the functional use of the feature in combination with other features it relates to in the invention, the combination of features is able to operate.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterising features described in the description and/or shown in the attached drawings. The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of a device will now be described, by way of example only, with reference to the accompanying schematic drawings in which corresponding reference symbols indicate corresponding parts, and in which.

The drawings are not necessarily on scale.

DESCRIPTION OF PREFERRED EMBODIMENTS

Figure 1:
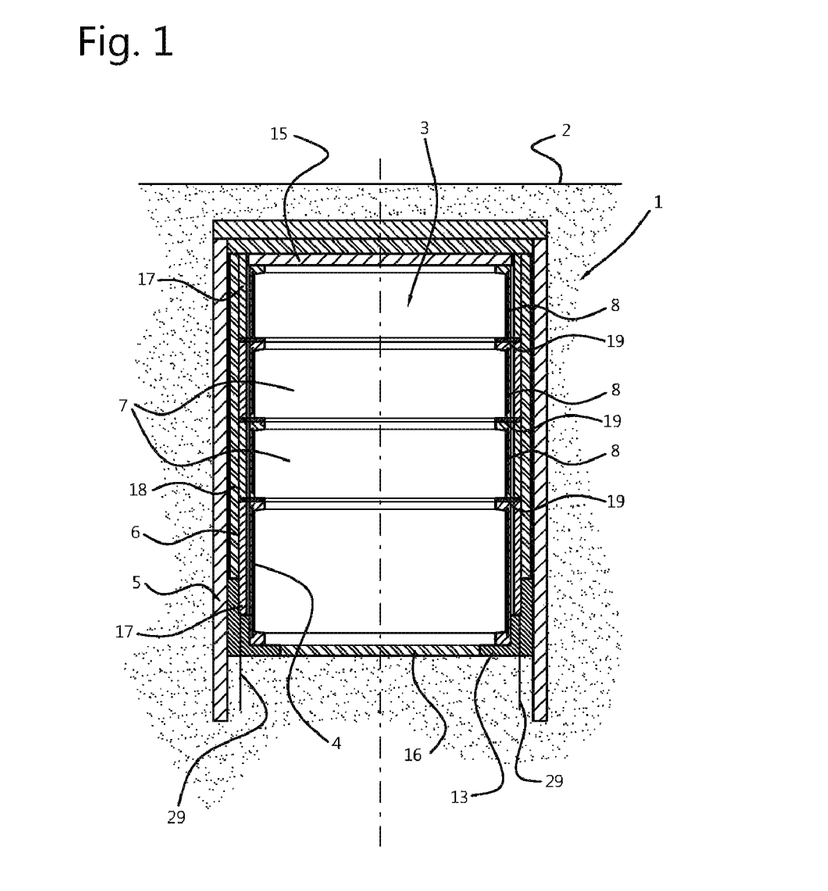
FIG. 1 schematically an underground thermal energy storage in cross section.

FIG. 1 schematically depicts an underground thermal energy storage 1 in vertical cross section. In use, the underground thermal storage may be operated in such away that stratified thermal layers result. A thin layer in which temperature changes rapidly is also referred to as thermocline.

In FIG. 1, the ground-level 2 is indicated. In an embodiment, the upper level of the medium inside an underground thermal energy storage 1 is provided at or below the ground water level. The energy storage 1 has an inner volume 3. In the inner volume 3, one or more media can be provided for storing thermal energy. In an embodiment, the energy storage may fill with groundwater. This groundwater may be heated (or cooled).

The thermal storage 1 further comprises an inner wall 4 and an outer wall 5. Between the inner wall 4 and the outer wall 5 a spacing exists that may be filled with a filling layer 6. The filling layer 6 may completely or partially fill the space or gap between the inner wall 4 and the outer wall 5. It comprises her an insulating layer 17 and a structural layer 18.

In the embodiment of FIG. 1, the inner wall 4 has rings 7 that are in this embodiment thermally isolated from one another and that each comprise a heat exchangers 8. Using these thermally isolated rings 7 and the heat exchangers 8, thermal energy can be added to a layer or can be retrieved from a layer. In this way, the medium in the inner volume 3 can be used in stratified, thermal layers. A lid 15 seals the thermal storage. Usually, an air space or air pocket remains between the upper level of the medium and the lower surface of the lid 15.

In an embodiment, one or more of the layers may comprise another liquid, or may have a different temperature regime. Examples of possible layers and/or liquids are combining an increase in salt level in different layers, making one or more layers brine layers, using for instance glycol as a top layer, or in fact cooling the lower layer, using it as a storage for cold, thus de facto creating an ice cellar. Usually, separation between layers with different temperatures may occur and remain automatically. Using the different media, it is possible to make temperature differences between layers even bigger. It may even or additionally be possible to provide separation layers between layers. As an example, such a separation layer may be a just preventing diffusion of one or more components of the medium. Such a layer may comprise a foil or a membrane, for instance a polymer foil, a rubber foil, a polymer membrane, a rubber membrane, or a combination thereof. Such a layer may also have an insulating function. In such a case, the thickness of the layer may be adjusted. The material of the layer may be selected in a way to remain floating between medium layers. These medium layers may have a different densities. For instance, the medium may comprise a (lowest) layer of salt water or even brine, then a layer comprising mainly water, for instance originating from groundwater. The medium may further comprise an upper layer of water comprising for instance glycol. The density differences as well as their modified freezing and boiling points allow storage at different temperatures.

Figure 2:
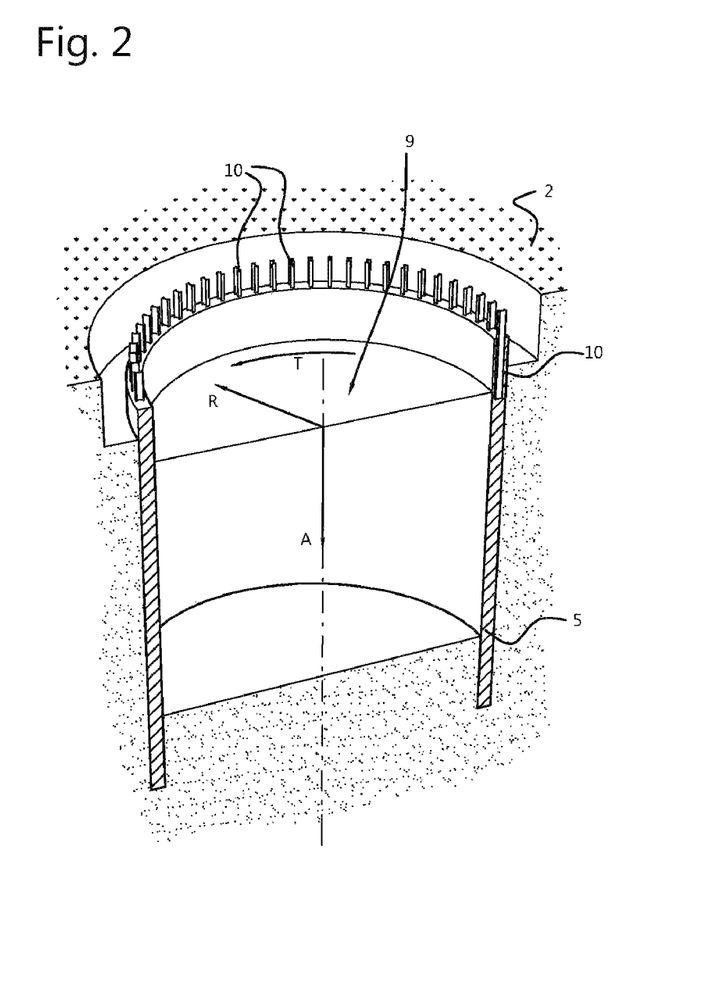
FIG. 2 schematically shows a building stage of the underground thermal energy storage.

In FIG. 2, an earlier stage of producing the underground thermal energy storage 1 is shown. The top soil layer is first removed. Here at this stage, the outer wall 5 is ready and encloses an inner space 9. The inner space 9 here filled with groundwater. The outer wall 5 comprises reinforcement beams 10 that are included in at least partially incorporate into the outer wall 5 and which are here substantially vertically aligned. Here the reinforcement beams extend only in part of the vertical or axial direction of the outer wall 5. The reinforcement beams 10 can in an embodiment extend in substantially the vertical or axial height of the outer wall 10.

Figure 3:
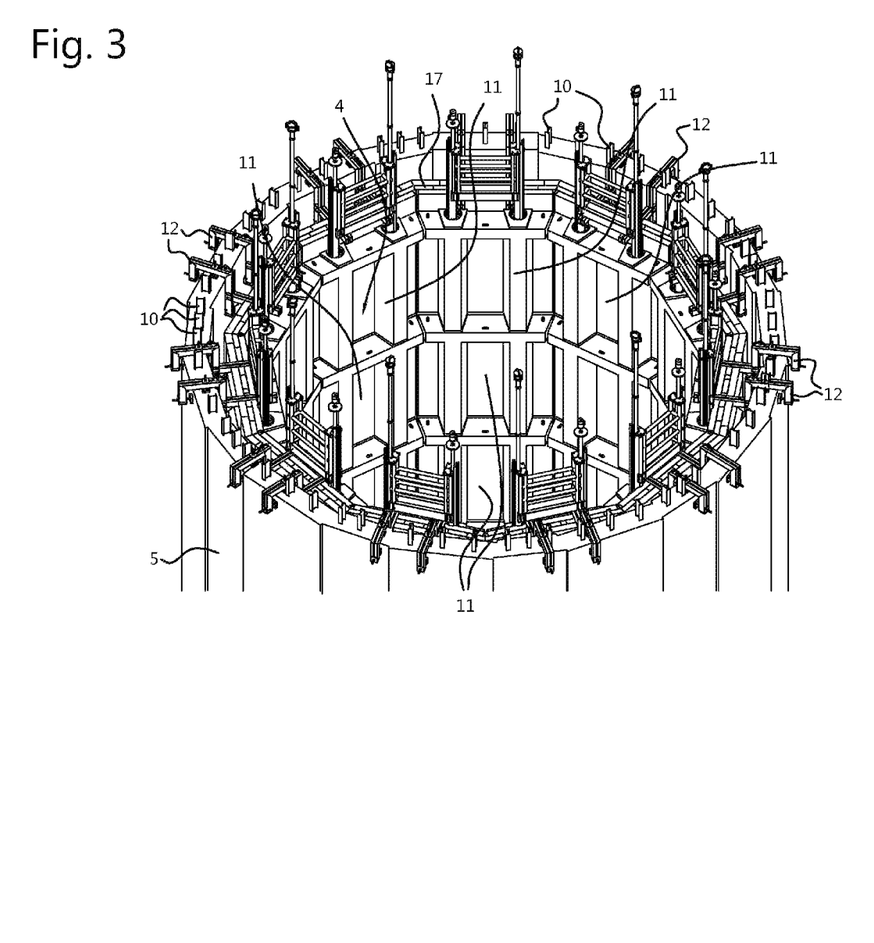
FIG. 3 schematically shows a part of a top of the underground energy storage during assembly of the inner wall.

The outer wall is in this drawing substantially a circle, but in this embodiment fact has an n-gonal cross section. In FIG. 3, this indicated more clearly. This is due to the method of production. After the top soil layer is removed, first the outer wall is produced in-situ. A mix-cutter head having a length is each time lowered vertically while concrete is added to the loosened soil and part of the soil is removed. Thus, in fact each time a vertical wall slab is created in situ. This process as such is known as a soil mix process. In this way, here in fact an n-gonal right prism is created out of coupled vertical wall slabs. When the outer wall 5 has a closed circumference, the soil that is enclosed by the outer wall 5 can be removed. Usually, if the underground thermal energy storage 1 is constructed below ground water level, the inner volume 9 fills with groundwater.

In FIG. 3, the top part of the underground thermal energy storage 1 is depicted during construction of the inner wall 4. At this stage, the inner wall 4 is placed, but alignment structures 12 that couple the inner wall 4 with outer wall 5 are still in place.

In FIG. 3, it is further depicted that the inner wall 4 comprises a series of modular wall parts 11. Here, these modular wall parts 11 are in fact prefab elements. The modular wall parts 11 are here stacked into vertical cylinder segments, and also form the rings 7. The modular wall parts 11 are places inside the inner volume 9 enclosed by outer wall 5. This inner volume 9 usually is already filled with ground water. Alignment of the inner wall 4 in absolute sense and with respect to the outer wall 5 thus poses a problem. To that end, in an embodiment first the lowest cylinder of wall parts 11 is first placed in the inner volume 9, and provided with alignment poles 27, and with alignment frames 12 that connect the upper part of the alignment poles 27 and the outer wall. Furthermore, some additional alignment means are used which will be explained using the further drawings. Once all the wall parts are submerged into the inner volume 9 over the alignment poles 27 and rest on the lowest cylinder of wall parts 11 which are already properly aligned, additional alignment can be done using the alignment poles attaches via alignment frames 12 to the outer wall 5.

Figure 4:
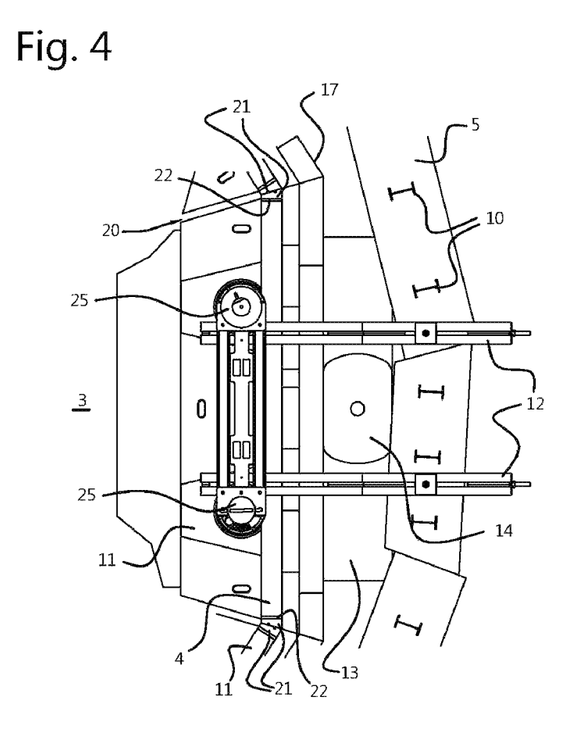
FIG. 4 shows a part of the underground energy storage at the building stage of FIG. 3 in top view.
Figure 5:
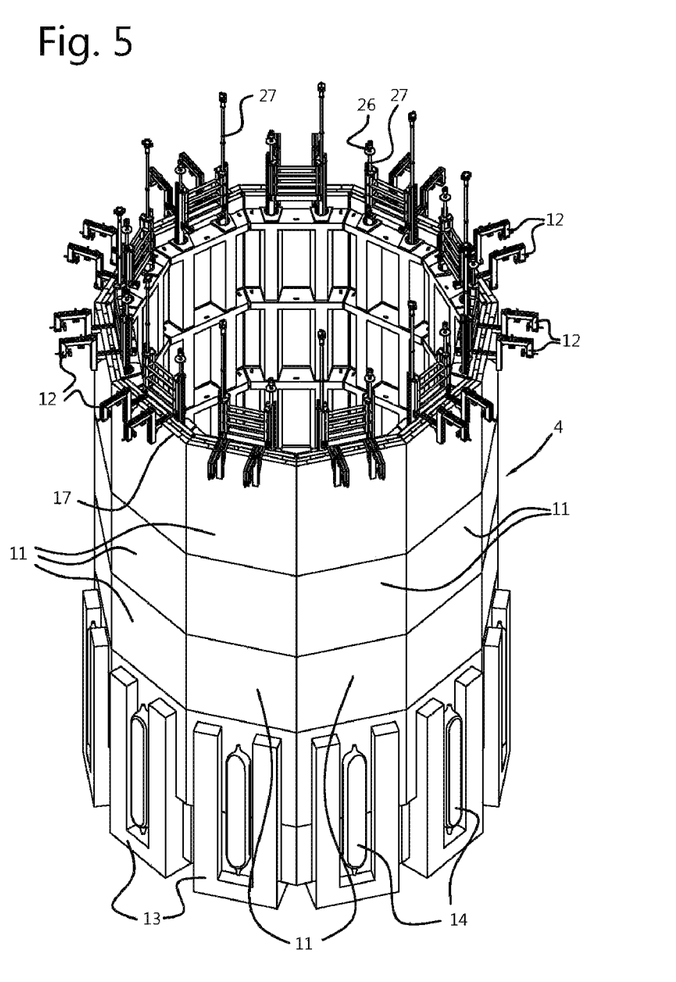
FIG. 5 schematically shows the inner wall of the underground thermal energy storage, at the building stage of FIG. 3.

FIG. 4 shows a top view of a part of the underground thermal energy storage 1, looking down in the gap between the inner wall 4 and outer wall 5. During construction, usually this gap is filled or fills with upcoming groundwater. FIG. 5 shows only the inner wall 4, for clarity without the surrounding outer wall 5. It shows parts of the additional alignment means 13 and 14 for aligning and subsequently fixing the position and orientation of the lowest ring 7. Alignment fixtures 13 are containers with flexible walls that are fixed to the lowest modular wall parts 11. In an embodiment, these alignment fixtures 13 are bags that can be filled and then set the position of the wall part. The alignment fixtures 13 may to that end, once its corresponding wall part 11 is properly positioned and aligned, be filled with for instance sand, concrete, or another, similar setting compound.

The lowest modular wall parts 11 may in an embodiment further be provided with alignment actuators 14. In the current embodiment, to that end bags or bladders 14 are provided. These alignment actuators 14 can be filled for instance with water. By changing the water pressure inside, these alignment actuators are able to move the wall parts 11.

Figure 6A:
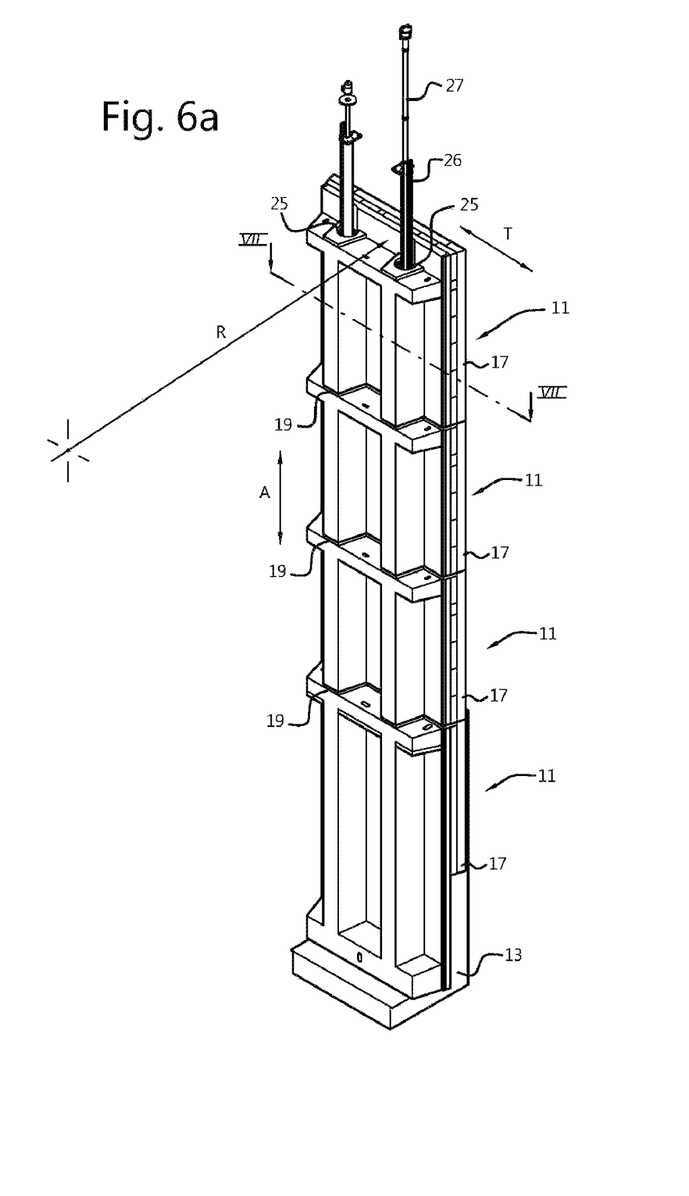
FIG. 6a schematically shows a column of wall parts of the inner wall of the thermal energy storage of FIG. 5, seen from the inside.
Figure 6B:
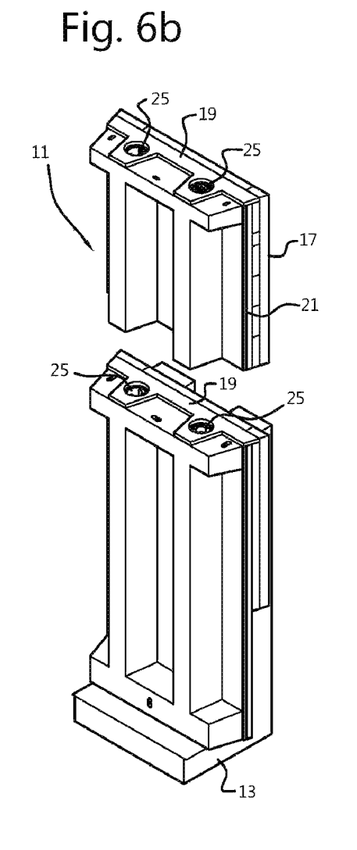
FIG. 6b shows an exploded vies of the lowest wall parts of FIG. 6a, seem from the inside of the underground thermal energy storage.
Figure 6C:
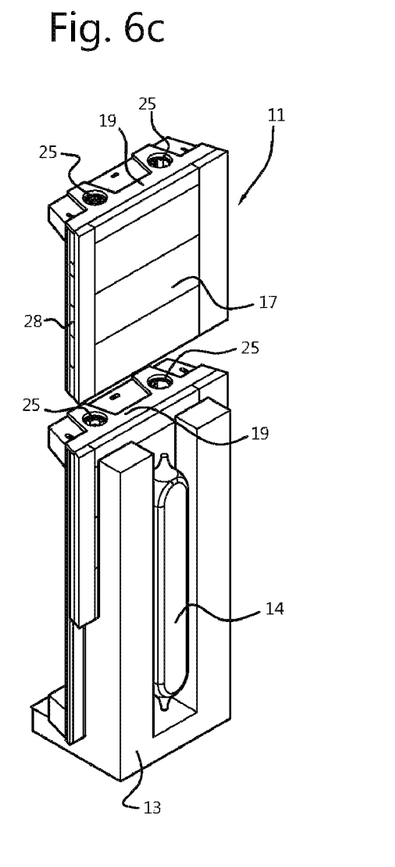
FIG. 6c shows the wall parts of FIG. 6b seem from the outside of the underground thermal energy storage.

FIGS. 6a-6c show the wall parts 11 and the various parts of the alignment and positioning means in more detail. After the outer wall 10 is constructed and the inner space 9 has been cleared by removing the earth inside, an important and delicate phase of constructing the inner wall 4 begins.

First, an alignment structure 12 is provided. To this end, frame elements 12 are attached to the outer wall 5. These frame elements 12 comprise yokes. First the height of the frame elements 12 will be set, making the frame elements aligned in height. Attached to these frame elements 12 are vertical alignment beams 27. The alignment beam may comprise segments. Each time the lowest wall part 11 is lowered further, an additional segment is added. This to avoid manipulation of lengthy beams.

In a further step, the lowest ring of wall parts will be placed. In FIG. 6a-6c it can be seen that these lowest wall parts differ from the further wall parts, as these wall parts have a lower reinforcement rib. Furthermore, an alignment fixture 13 is added. To each lowest wall part 11. Furthermore, an alignment actuator 14 is provided. The alignment fixture 13 at first is a flexible bag that is empty when the lowest wall parts 11 are sank into position. Furthermore, the alignment actuator 14 is also empty. First, alternating lowest wall parts 11 are placed. Thus, when numbering the lowest wall parts in transverse direction, first the odd numbered lowest wall parts 11 are lowered over the alignment beams 27. In an embodiment, the odd-numbered or first-placed lowest wall parts do not comprise the swell seal mastic bands 24. The height of these odd-numbered lowest wall parts 11 is set. Using for instance a laser height measuring device, the height is controlled. At this stage, the lowest wall parts 11 rest a little above the bottom of the inner space. Usually, the lowest wall parts 11 rest about 30-50 cm above the bottom of the inner space 9. This bottom is not equalised. Thus, all the odd-numbered lowest wall parts 11 are now aligned at a proper height. The lowest wall parts 11 are now fixed in position using ground pins 29 or ground anchors. In the current embodiment, ground pins 29 (FIG. 29) hang on wires inside the alignment beams 27. The wire are cut, and the ground pins 29 fall down and are further inserted into the bottom below the lowest wall parts 11, fixing the position of the odd-numbered lowest wall parts 11 in radial direction R and in transverse direction T. The height is maintained as the lowest wall parts 11 still hang on the alignment structure 12.

Next, the even numbered lowest wall parts 11 are lowered, each time an even-numbered lowest wall part 11, filling the space between two odd-numbered lowest wall parts 11. Again, the height is checked and set. Next, the position of the even-numbered lowest wall parts 11 is fixed in the same way as the odd-numbered wall parts using ground pins 29. The order of placement of the wall parts 11 distributes tolerances evenly.

Next, the alignment actuators 14 are activated. These alignment actuators press the wall parts 11 together in radial direction R with a force directed to the centre. Here, the alignment actuators 14 comprise balloons that are in fluid communication with a common reservoir. The reservoir is located above surface level 2. By setting the height of the reservoir, the pressure inside the balloons is regulated in a simple manner. The common reservoir distributes the pressure evenly around the perimeter of the storage.

In a next step, the alignment fixtures 13 are activated. As mentioned, in this embodiment empty bags are fixed to the lowest wall parts 11 as they are lowered. When all the lowest wall parts 11 are in place and aligned to fixed, the empty bags are filled. Here, the empty bags are slowly filled with a setting composition. An example of such a composition is a mortar. In particular cement mortar. It can be selected according to the need. When filled, the alignment fixture 13 fills the space below the lowest wall parts and the bottom of the inner space, and further fixes the position of the lowest wall parts 11. Furthermore, the alignment fixture 13 in this embodiment comprises a part that fills a space between the outer wall 5 and the insulation layer 17. It thus additionally provides a radial alignment and radial fixation. In particular in combination with wall parts 11 that are shaped as cylinder segments.

After the composition of the alignment fixtures is set, a bottom 16 may be created in the inner volume 3 (FIG. 1). This can be done using known methods for underwater constructing. The bottom 16 can be used in particular when the medium differs from groundwater, or if additional insulation is needed.

Next, the alignment actuators 14 are deactivated. Here, the balloons are emptied. This allows the alignment actuator to be removes for re-use, or it may be used for the next ring of wall parts 11.

As the lowest ring is now positioned, aligned and fixed, the alignment structure 12 may be removed. Next wall parts 11 are lowered over the alignment beams 27. After the last ring of wall parts 11 is placed, the alignment beams 27 are removed. The alignment beams can be re-used.

When all the wall parts for the inner wall are positioned, a remaining space or gap between the insulating layer 17 and the outer wall 5 can be filled with setting material for forming the structural layer 18. This will keep the wall parts 11 in place, but will allow the wall parts to be dynamically coupled, not to be mechanically fixed to one another. In this way, changes in volume, thermal expansion and contraction, end the like, can be absorbed. The structural layer 18 may comprise concrete or mortar that is poured into the gap. Additionally of in combination, other solid material may be combined, like pebbles or the like.

In a next step, a lid is provided to cover the inner volume 3. Here, first an inner lid is constructed. In operation, an air pocket is left between the upper surface of the medium and the lower surface of the lid. The inner lid can for instance be made using channel plates/hollow core slabs. Next, the heat exchangers 8 can be connected. Here, the conduits of the heat exchanges 8 are coupled. The heat exchangers 8 are coupled according to the Tichelmann principle. Next, the channels or piping duct 25 may also be filled with a setting composition, like concrete or mortar or the like.

Figure 7:
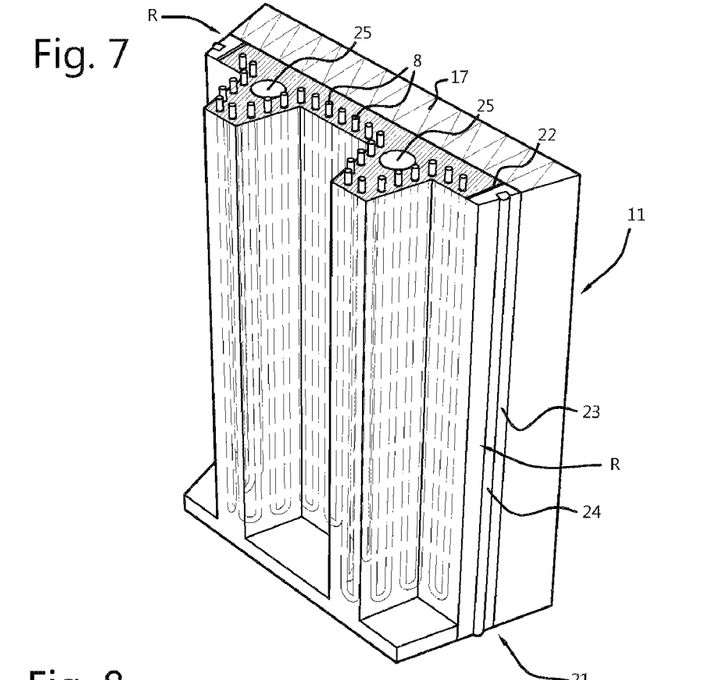
FIG. 7 schematically shows a part of a wall part, in cross section as indicated in FIG. 6a and showing a layout of the heat exchanger, and FIG. 8 a cross section through a wall part of FIGS. 6a-6c.

Each inner wall part 11 may be provided with a heat exchanger 8. In FIG. 7, showing a part of a modular wall part 11, an embodiment of the heat exchanger 8 of a modular wall part 11 is shown. The heat exchanger 8 here comprise a conduit that is indicated in a striped line and that runs just below the inner tangential surface of a modular wall part 11. The conduit of the heat exchanger 8 here has one end that connects into one piping duct 25 and another end that connects to another piping duct 25 of the modular wall part 25 (not shown).

Figure 8:
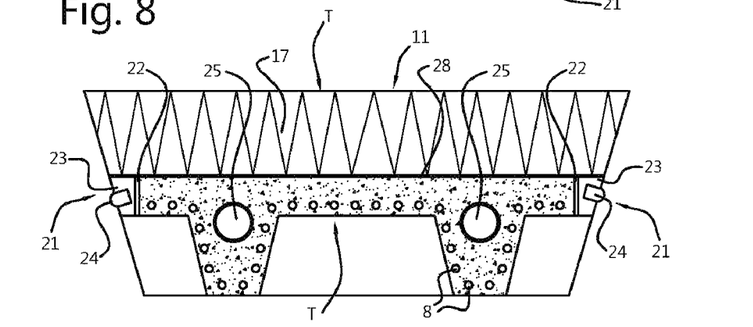

In FIGS. 7 and 8, a horizontal cross section through a modular wall part 11 is shown as indicated in FIG. 6a. It shows the piping duct 25, the conduits of its heat exchanger 8, and the insulating layer 17 that is attached to the concrete outer tangential surface. The insulating layer 17 is here held to the concrete surface via a flexible adhesive layer 28.

As explained above, the modular wall parts 11 rest on top of one another, with in this embodiment an insulating layer 19 between the radial surfaces of the modular wall parts 11. Furthermore, the modular wall parts 11 are placed against one another, connected at their axial surfaces via a sealing 21. The sealing 21 prevents liquid communication between the inner volume 3 and the outside of the storage via a space between the inner wall 4 and the outer wall 5. The modular wall parts 11 rest freely against one another. The sealing 21 is elastically compressible in tangential direction T. A column of stacked wall parts 11 in fact provide staves of a barrel. Between the (vertical) radial surfaces of neighbouring staves, the sealing 21 is provided. In the embodiment shown in FIG. 8, the sealing 21 at the left can be compressed when pressure is exerted towards the right. The sealing 21 at the right can be compressed when pressure is exerted to the left in the drawing. Thus, pressure with a component in plane of the wall parts 11 and compressed the sealing. In this way, the sealing 21 can take up dimensional changes in the modular wall part 11. For instance, it was realized that when the medium in the storage expands 2% in volume when heated, the circumference changes less than 1%. When the width of a modular wall part 11 is 1 meter, this means that a sealing needs to take up less than 1 cm. The sealing 21 here comprises a flexible, resilient layer 22. Here, a strip of rubber material like (natural) rubber or an elastomeric material is used. The thickness is at least 1 cm. In an embodiment, the thickness of the layer is below 3 cm. The sealing 21 here further comprises a wedge 23. Here, the wedge is made from an form-stable material, like wood, polymer material, or the like. The wedge 23 allows forming of the circular of polygonal rings 7. Additionally, here a band of hydrophilic expansive strips 24 are provided for additional sealing. These strips 24 can be swell seal mastic, for instance composed of bentonite. In an embodiment, the odd-numbered lowest wall parts 11 may not be provided with these strips 24 to avoid swelling when positioning takes more time then estimated. In the current embodiment, both sides of a wall part 11 comprise the strips 24. It may also be possible to have only one side of each wall part 11 be provided with these strips 24.

A structural layer 18, here between the insulating layer and the inner surface of the outer wall 5, is provided. In fact, the structural layer 18 fills the remaining space or gap between the outer wall 5 and the outer surface of the insulating layer 17. For instance, a setting composition may be used. An example of a setting composition is concrete. The outer surface or outer transverse surface T of the wall parts 11 can be provided with a reinforcement, like wired mesh, for concrete. Thus, the structural layer 18 can be even more solid.

Example of Medium

An example of a density-stratified medium is the following.

The lowest layer of medium is a layer of water with salt added. In an example, for instance salt comprising at least 50% by wt. of NaCl is used. The density of salt water is larger than the density of water. When for instance more than 250 gram of salt per liter water is used, a temperature of below −15° C. is possible while maintaining a liquid medium layer.

On top of the salt water, a layer of rubber granulate may be provided. For instance granulate having a specific density of 1150 kg/m³. The material has a lambda value of 0.29, and a layer thickness of 1.0 mm.

The next layer is substantially composed of groundwater. This layer allows a temperature range of between 5° C. tot 95° C.

On top of the groundwater layer, a film of (natural) oil may be provided as a separation layer.

The top layer of the medium can comprise a water-glycol mixture that has a boiling temperature of above 130° C., and has a density of about 950-970 kg/m³, more in particular about 966 kg/m³.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of this invention and are obvious combinations of prior art techniques and the disclosure of this patent.

REFERENCE NUMBERS 1 underground thermal energy storage
2 surface level
3 inner volume
4 inner wall
5 outer wall
6 filling layer
7 ring
8 heat exchanger
9 inner space
10 outer wall reinforcement
11 modular inner wall part
12 alignment structure
13 alignment fixture
14 alignment actuator
15 lid
16 bottom
17 insulating layer
18 structural layer
19 ring insulating layer
20 vertical inner wall part gap
21 vertical elastic sealing
22 resilient elastic sealing strip
23 sealing beam
24 sealing band
25 piping duct/conduit
26 heat exchanger coupling conduit
27 vertical alignment beam
28 adhesive layer
29 anchoring pin
A Axial
R Radial
T tangential

The invention claimed is:
1. An underground thermal energy storage:
having a shape selected from cylindrical and an n-gonal prism,
having an axial direction that in use is vertical, and comprising an inner volume for holding a liquid,
said underground thermal energy storage comprising:
a peripheral outer wall that defines the shape,
a peripheral inner wall around said inner volume, and
a filling layer between said inner wall and said outer wall,
said inner wall comprising modular wall parts arranged in a ring, each of the modular wall parts:
provided with a heat exchanger for exchanging thermal energy with said liquid,
having opposite radial surfaces that are in use vertical, an inner tangential surface contacting said inner volume, an outer tangential surface directed towards said outer wall, and opposite axial surfaces that are in use horizontal, and comprising an elastic sealing between a joint of adjacent radial surfaces that limits liquid flow between the inner volume and the filling layer and takes up thermal expansion of the modular wall parts, and said filling layer comprising:

an insulating layer extending over at least part of a height of the underground thermal energy storage, having a thermal resistance R value where $R=d/\lambda[m^2K/W]$, in which d is a layer thickness of the insulating layer, and $\lambda$, the thermal conductivity of said insulating layer, wherein the thermal resistance R value is configured to keep said outer wall at a temperature of below 30° C. when said inner volume is at a temperature of at least 90° C., and a structural layer that maintains said insulating layer and said inner wall modular wall parts in position.

2. The underground thermal energy storage of claim 1, wherein said thermal resistance R value at an upper part of said underground thermal energy storage is at least 8 $m^2K/W$.

3. The underground thermal energy storage of claim 1, wherein said elastic sealing comprises a vertical expansion joint, compressible in tangential direction, between the adjacent radial surfaces.

4. The underground thermal energy storage of claim 1, wherein said insulating layer has a pressure resistance of more than 500 kPa.

5. The underground thermal energy storage of claim 1, wherein said structural layer comprises a setting composition including concrete and/or bentonite that provides a pressure resistance of more than 550 kPa.

6. The underground thermal energy storage of claim 1, wherein said peripheral outer wall is an in-situ produced soil mix wall.

7. The underground thermal energy storage of claim 1, wherein said ring comprises two or more vertically stacked rings that are functionally thermally insulated.

8. The underground thermal energy storage of claim 1, wherein a first ring of the modular wall parts is stacked above a second ring of the modular wall parts, further comprising a horizontal thermally insulating layer between adjacent axial surfaces of the modular wall parts of the first ring and the modular wall parts of the second ring.

9. The underground thermal energy storage of claim 1, further comprising a bottom layer connected to said inner wall and/or said outer wall, and a lid above an upper level of the liquid, such that the lid is at, above, or below a ground level.

10. The underground thermal energy storage of claim 1, wherein in use the inner volume is at least partially filled with the liquid, wherein the liquid is a medium for allowing energy storage.

11. The underground thermal energy storage of claim 10, wherein a first ring of the modular wall parts is stacked above and thermally insulated from a second ring of the modular wall parts, and wherein the medium comprises a first layer having a first density and a second layer having a second density greater than the first density, and wherein the first layer is within the first ring and the second layer is within the second ring.

12. The underground thermal energy storage of claim 10, wherein the medium includes a lowest layer that can store energy at a temperature of the medium below a temperature outside said underground thermal energy storage, and wherein the medium does not solidify at a temperature of the medium below −5° C.

13. The underground thermal energy storage of claim 1, wherein the heat exchanger comprises one or more conduit systems at or below an inner surface of the modular wall part.

\* \* \* \* \*